United States Patent
MacDowell

(10) Patent No.: US 9,706,751 B2
(45) Date of Patent: Jul. 18, 2017

(54) SYSTEM FOR INCREASING CLEANLINESS OF A SLEEPING AREA OF A DOMESTICATED ANIMAL

(71) Applicant: Roberta MacDowell, Lake Worth, FL (US)

(72) Inventor: Roberta MacDowell, Lake Worth, FL (US)

(*) Notice: Subject to any disclaimer, the term of this patent is extended or adjusted under 35 U.S.C. 154(b) by 137 days.

(21) Appl. No.: 14/726,469

(22) Filed: May 30, 2015

(65) Prior Publication Data
US 2016/0135422 A1  May 19, 2016

Related U.S. Application Data

(60) Provisional application No. 62/004,942, filed on May 30, 2014.

(51) Int. Cl.
*A01K 29/00* (2006.01)
*A01K 1/035* (2006.01)

(52) U.S. Cl.
CPC .................. *A01K 1/0353* (2013.01)

(58) Field of Classification Search
CPC .................................... A01K 1/0353
USPC ....................................... 119/28.5
See application file for complete search history.

(56) References Cited

U.S. PATENT DOCUMENTS

| | | | | |
|---|---|---|---|---|
| 6,155,206 A * | 12/2000 | Godshaw | ............. | A01K 1/0254 119/453 |
| 6,370,715 B1 * | 4/2002 | Morton | .................. | A47D 7/002 5/655 |
| 6,966,275 B2 * | 11/2005 | Whitehill | ............. | A01K 1/0353 119/28.5 |
| 7,275,502 B2 * | 10/2007 | Boyd | .................... | A01K 1/0353 119/721 |
| D584,012 S * | 12/2008 | Abernathy | .................... | D30/118 |
| 7,559,290 B2 * | 7/2009 | West | .................... | A01K 1/0353 119/28.5 |
| 7,669,552 B2 * | 3/2010 | Arvanites | ............ | A01K 1/0353 119/28.5 |
| 8,627,520 B1 * | 1/2014 | Morton | .................. | A47D 9/005 190/2 |
| 2003/0066489 A1 * | 4/2003 | Whitehill | ............. | A01K 1/0353 119/28.5 |
| 2005/0211175 A1 * | 9/2005 | Johnson | .................... | A45C 9/00 119/28.5 |
| 2006/0070577 A1 * | 4/2006 | Foley | .................... | A01K 1/0353 119/28.5 |
| 2006/0288953 A1 * | 12/2006 | Bottorff | ................. | A01K 1/035 119/497 |

(Continued)

*Primary Examiner* — Kristen C Hayes

(57) ABSTRACT

A system for increasing the cleanliness of a sleeping area of a domesticated animal is disclosed. The system includes an inflatable mattress having a top opposing a bottom and a four sides. The top and sides of the mattress comprise non-permeable material configured for easy removal of dirt and other contaminants. A removable cover for covering the top and a portion of the four sides is removably coupled to the mattress by a plurality of fasteners. The removable cover comprises material that is washable. A plurality of downward facing suctions cups are affixed to the bottom of the inflatable mattress. The suction cups affixed to the bottom of the inflatable mattress are configured for preventing movement of the mattress when the suction cups engage an external surface.

4 Claims, 5 Drawing Sheets

(56) References Cited

U.S. PATENT DOCUMENTS

| | | | | |
|---|---|---|---|---|
| 2007/0044722 A1* | 3/2007 | West | ............... | A01K 1/0353 119/28.5 |
| 2007/0125312 A1* | 6/2007 | Boyd | ............... | A01K 1/0353 119/721 |
| 2008/0295775 A1* | 12/2008 | Arvanites | ............... | A01K 1/0353 119/28.5 |
| 2010/0043713 A1* | 2/2010 | West | ............... | A01K 1/0353 119/28.5 |
| 2010/0175633 A1* | 7/2010 | Krauss | ............... | A01K 1/0254 119/497 |
| 2014/0026972 A1* | 1/2014 | Stevens | ............... | A01K 1/0157 137/12 |
| 2016/0057971 A1* | 3/2016 | Jenkins | ............... | A01K 1/0157 119/28.5 |

* cited by examiner

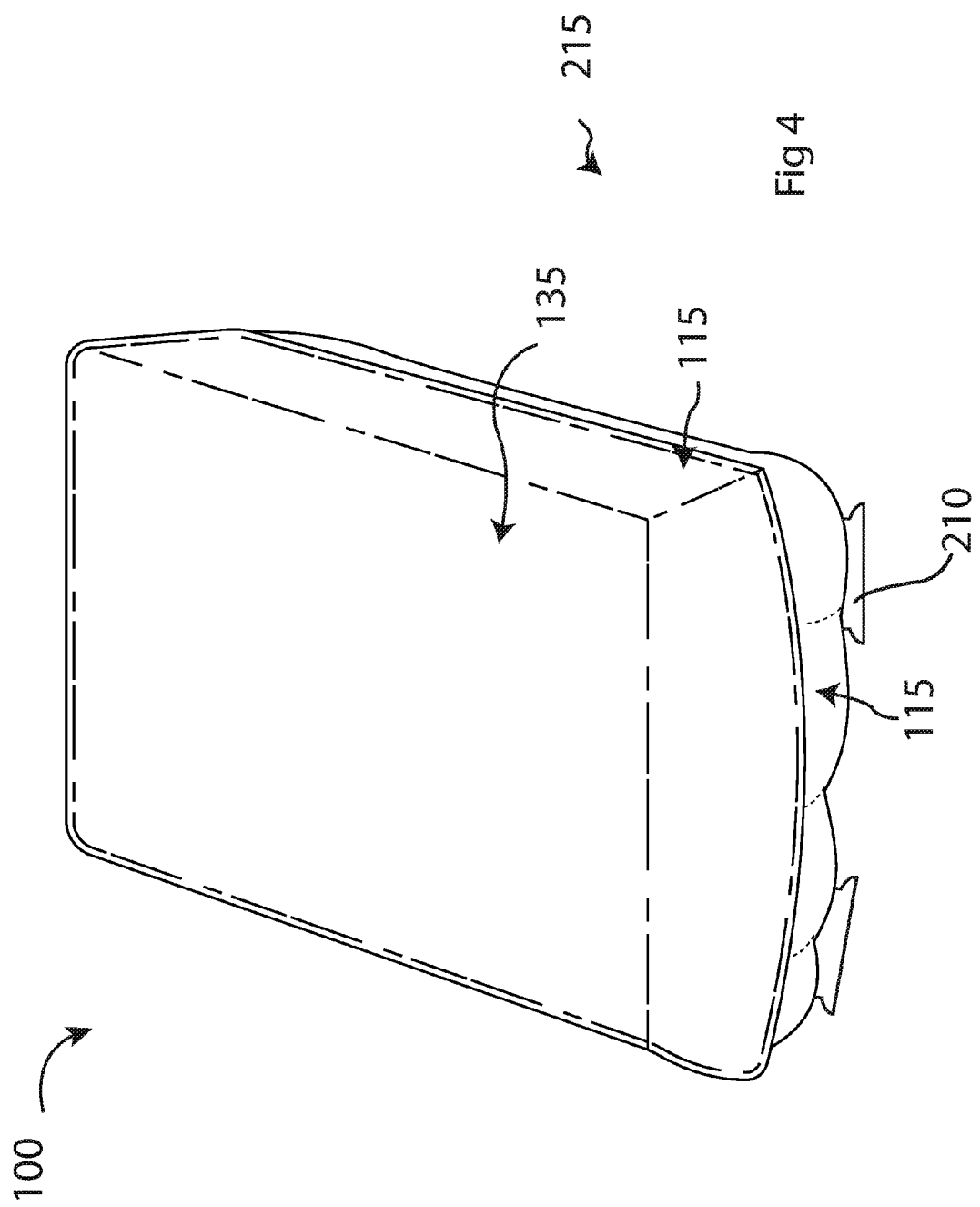

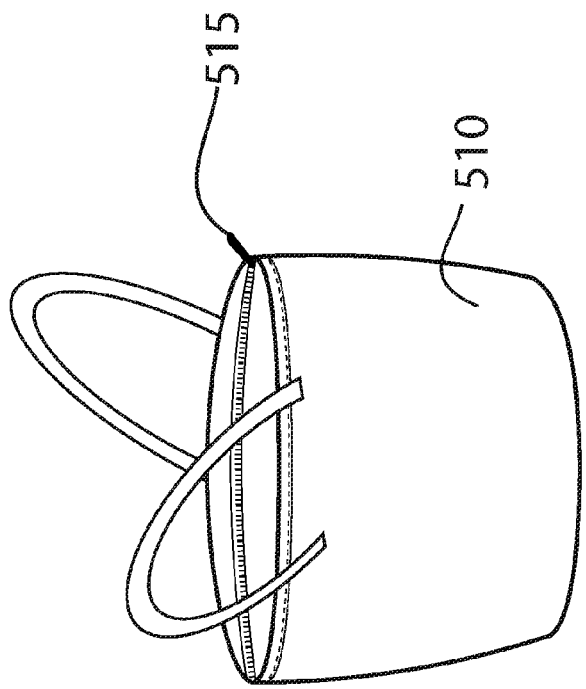
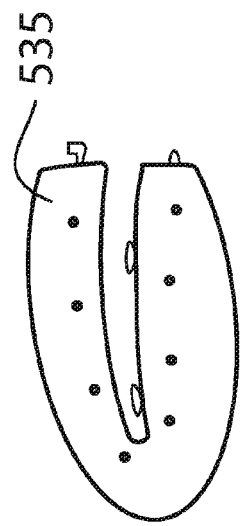
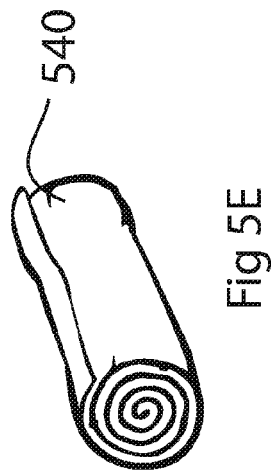
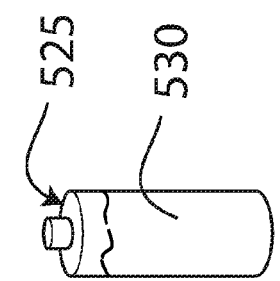
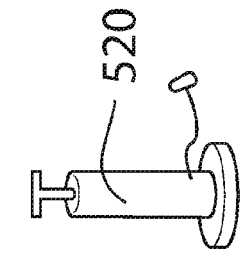

SYSTEM FOR INCREASING CLEANLINESS OF A SLEEPING AREA OF A DOMESTICATED ANIMAL

CROSS-REFERENCE TO RELATED APPLICATIONS

This application claims the benefit of the filing date of U.S. Provisional Application Ser. No. 62/004,942 filed May 30, 2014 and the subject matter of which is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of sanitization and more specifically it relates to the field of sanitizing areas used by domesticated animals.

BACKGROUND

In 2014, $58.04 billion was spent on pets, such as dogs and cats, in the United States alone. As pets, become old they can develop incontinence. Incontinence is a term that describes any accidental or involuntary loss of urine from the bladder (urinary incontinence) or bowel motion, faeces or wind from the bowel (faecal or bowel incontinence). As incontinence develops and pets are unable to restrain from accidental urination, pets can soil their sleeping area. When this happens, the area where the bed is positioned and the bed can have a stench and result in unsanitary conditions. The unsanitary conditions can cause illness and can facilitate the spread of other diseases. Additionally, the unsanitary conditions can cause health from problems to animals living close to such area.

Additionally, when pets are provided with sleeping arrangements that are improperly designed, the results are often troublesome. Pets have a natural tendency to maneuver their sleeping area to create a more comfortable sleeping arrangement. As a result, pets often both soil and destroy the beds provided for them. When this happens the result can be an aesthetically poor area within a person's home.

Also, when pets manipulate their sleeping areas, pets have a tendency to move their beds from the bed's desired location. Similarly, when pets jump on, move around, or fidget on their beds, the beds can become displaced or moved from the location where the pet owner intends or desires the bed to remain. Such misplaced beds can be quite aesthetically unpleasant.

In today's society, many people and pet owners live in cities or areas where real estate and living area is limited. Many times pet owners desire a way to effectively and efficiently store pet beds out of sight or in a position or location that increases the amount of living area that the pet owner has when the pet bed is not in use. Currently, pet beds existing today do not provide an efficient way to keep the pet beds from unwantedly relocating from their desired position.

Additionally, today pet beds cannot be efficiently be cleaned, which can in unsanitary conditions for the pet owner as well as the pet.

As a result, there exists a need for improvements over the prior art and more particularly for a more efficient way to increase the cleanliness of a sleeping area of a domesticated animal as well to decrease the amount of unwanted movement of a pet bed.

SUMMARY

A system and kit for increasing cleanliness of a sleeping area of a domesticated animal is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for increasing cleanliness of a sleeping area of a domesticated animal is disclosed. The system allows a person to easily maintain the cleanliness where the area that a domesticated animal, such as a pet dog, lives or resides. The system comprises an inflatable mattress having a top opposing a bottom and a four sides. At least a portion of the top and sides of the mattress comprises PVC for easy removal of dirt and other contaminants. A removable cover comprising material that is washable and is configured for covering the top and at least a portion of each side of the inflatable mattress is removably coupled to the mattress by a plurality of fasteners when the system is in a fully assembled or inflated state. A plurality of downward facing suctions cups are affixed to the bottom of the inflatable mattress. The suction cups affixed to the bottom of the inflatable mattress are configured for preventing movement of the mattress when the suction cups engage an external surface or ground. Optionally, a hook or loop strap is affixed to a side of the mattress. The hook or looped material is configured such that it can be used to store or hang the mattress in a deflated state when the system is not in use.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 4 is a perspective view of the system having the removable cover removably coupled to the inflatable mattress, according to one example embodiment;

FIG. 5A is a perspective view of a tote bag for use with the system, according to one example embodiment;

FIG. 5B is a perspective view of a hand pump for use with the system, according to one example embodiment;

FIG. 5C is a perspective view of a container having a cleaning agent for use with the system, according to one example embodiment;

FIG. 5D is a perspective view of the mattress in a deflated state and folded, according to one example embodiment; and, FIG. 5E is a perspective view of the removable cover detached from the mattress and folded or rolled up, according to one example embodiment.

DETAILED DESCRIPTION

Figure 1:
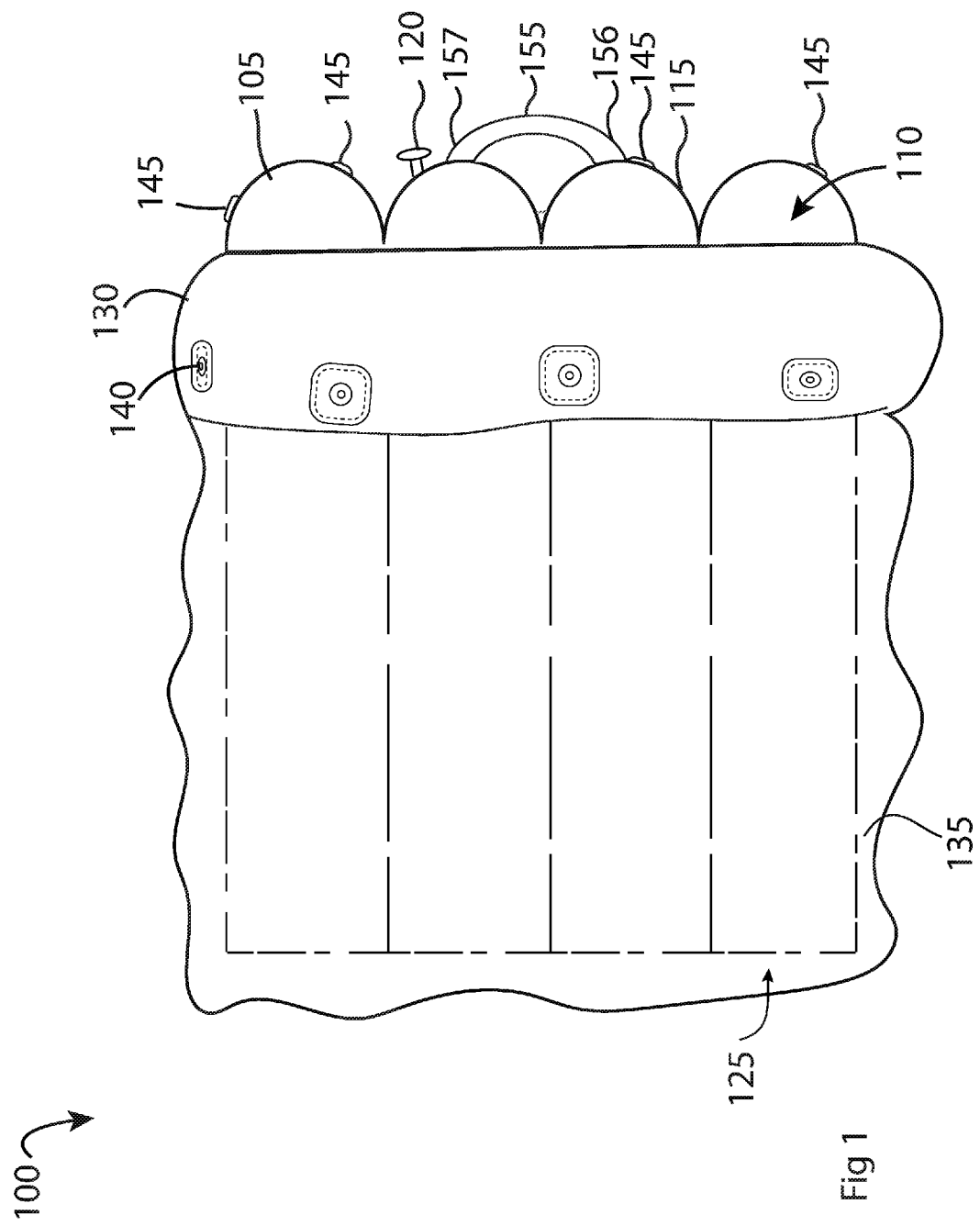
FIG. 1 is a top view of the system having a removable cover partially coupled to an inflatable mattress, according to one example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing an inflatable mattress with a removable cover that can be secured or fastened to the bed so that the cover is not removed from the bed when a pet pounces or jumps on the bed. The system also provides suction cups that can be used to prevent the bed from moving and also for storing the bed when not in use. The system's detachable or removable cover comprises material that can be washed to remove urine and other contaminants to keep the pet bed and surrounding areas sanitary and clean. The system's mattress also comprises material that is non-porous or permeable so that that contaminants can be easily removed or wiped from the surface of the mattress.

Figure 2:
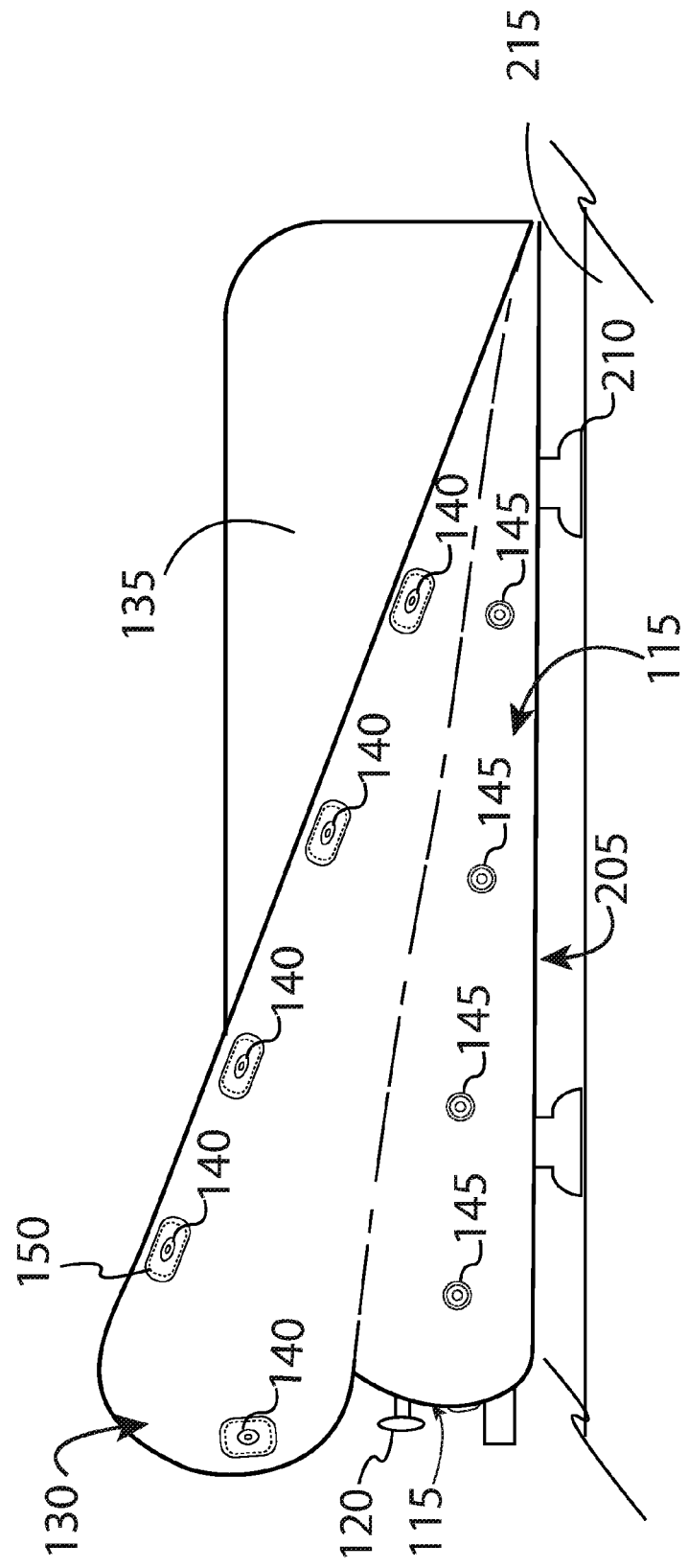
FIG. 2 is a side view of the system having the removable cover partially coupled to the inflatable mattress, according to one example embodiment.
Figure 3:
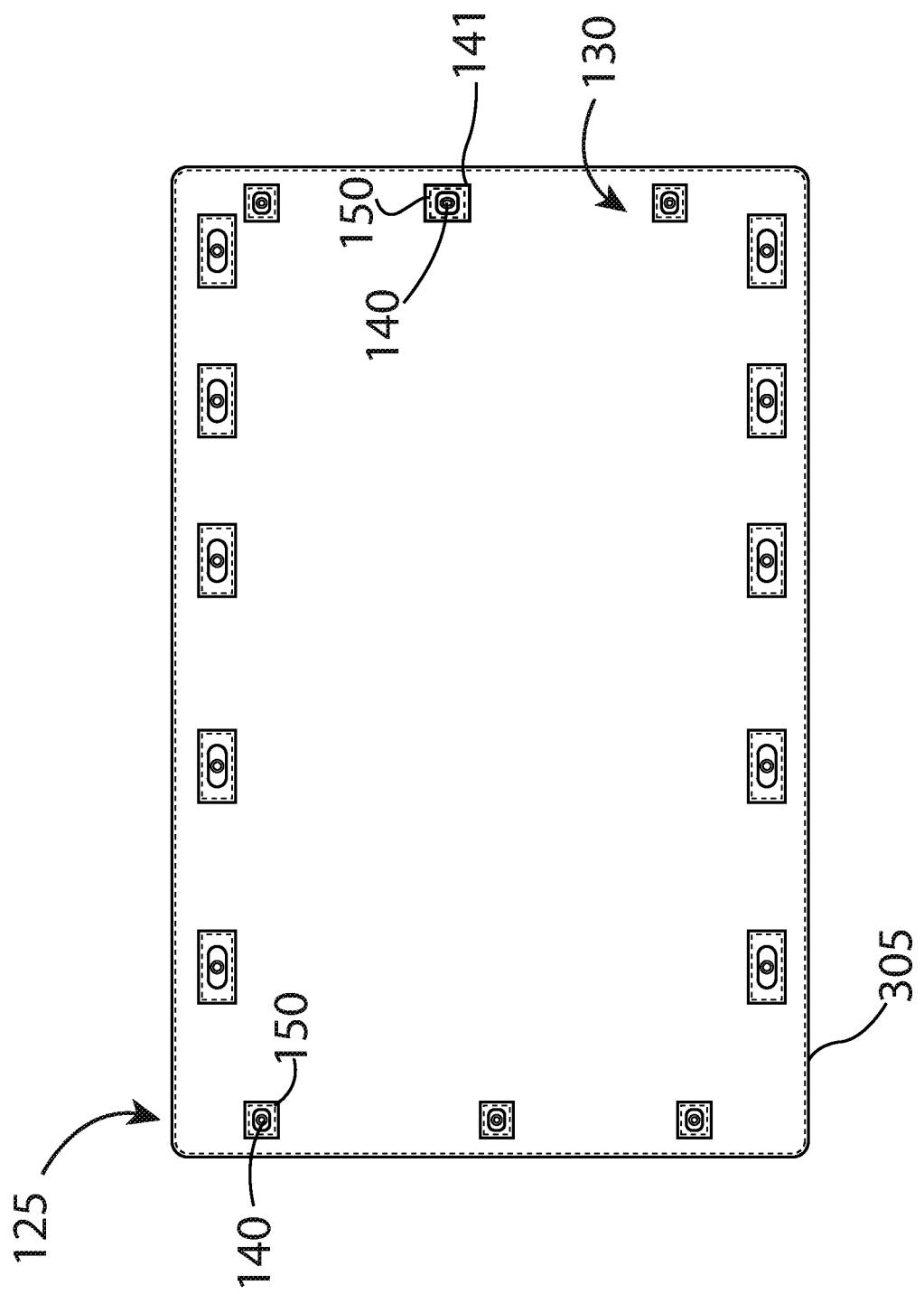
FIG. 3 is a bottom view of the removable cover detached from the inflatable mattress illustrating a mattress facing surface of the cover, according to one example embodiment.

Referring now to the Figures, FIG. 1 is a top view of the system 100 having a removable cover 125 partially coupled to an inflatable mattress 105. FIG. 2 is a side view of the system having the removable cover partially coupled to the inflatable mattress, according to one example embodiment. FIG. 3 is a bottom view of the removable cover of the system removed from the inflatable mattress, according to one example embodiment. FIG. 4 is a perspective view of the system having the removable cover removably fully coupled to the inflatable mattress in an inflated state, according to one example embodiment. FIGS. 1-4 will be discussed below to further explain the components of the system.

The system may be utilized for increasing cleanliness of a sleeping area of a domesticated animal. The system allows a person to easily maintain the area where a domesticated animal resides in a clean and sanitary fashion. The system includes an inflatable mattress 105 having a top 110 opposing a bottom 205 and a plurality of sides 115. The inflatable mattress has outward facing surfaces comprising non-permeable material configured for easy removal of dirt and other contaminants. The outward facing surface of the inflatable mattress can comprise material such as Polyvinyl chloride (PVC), reinforced urethane plastic or rubber, vinyl, nylon, latex.

In FIGS. 1, 2 and 4 the inflatable mattress is in inflated state. The inflatable mattress includes at least one inflatable member having a valve 120 for allowing a flow of air into and out of a reservoir (not shown) inside the mattress to adjust the mattress between an inflated state and a deflated state. In the inflated state, the bed is adapted to support the weight of an animal, such as a dog or cat. The inflatable mattress may also comprise support members (not shown) within the mattress to provide additional support for a domesticated animal on top of the mattress. The mattress may also be configured to support the weight of more than one domesticated animal. Different sized mattresses may be used for different size animals. For example, if the bed is designed for large dog, the mattress would have larger dimensions than if the system was configured for a small kitten. In the present embodiment, the mattress forms a rectangular shape, however, other shapes may be used, such as triangles, rectangles, polygons etc (or any combination thereof) may be used.

The inflated mattress can be inflated either orally by blowing into the valve, or by using a manual hand or foot-powered pump or inflated via an electric pump. The size of the opening of the valve may be configured such that mates with a feature of the pump or air providing mechanism. In other embodiments the mattress can be automatically inflating (up to a certain pressure some additional inflation may be also needed) just by opening the valve. Valves for controlling the flow of air inside and outside of an air mattress are well known to those in the art, however may include simple valves such as check valves.

A removable cover 125 can be attached to the inflatable mattress by a plurality of fasteners. The removable cover of the system is for covering the top 110 and at least a portion of each of the four sides 115 of the rectangular shaped inflatable mattress. The removable cover has a first surface or outward facing surface 135 opposing a second or mattress facing surface 130. Referring to FIG. 3, in the present embodiment, the cover is a somewhat rectangular shaped configured to cover the top and sides of the mattress. The first surface or outward facing surface is configured to face away from the mattress when the removable cover is positioned on top of the mattress. The second or mattress facing surface is configured to face or abut the mattress when the cover is removably coupled to the inflatable mattress. Proximate to the edge or perimeter 305 of the removable cover are a plurality of first parts 140 of fasteners. The first parts of these fasteners are configured to mate with the second parts 145 of the fastener. The second parts of the fasteners are positioned along the sides of the inflatable mattress.

The first part 140 of the fasteners may be affixed or stitched to the mattress facing surface of the cover with thread or other fabric. In other embodiments, the first part of the fasteners can be integral with the body of the removable cover. In one embodiment, the first part of the fastener may be affixed to the mattress facing surface 130 of the cover by using a piece of material or fabric 141 to attach the fastener to the removable cover. The fabric 141 can be attached by showing, glue, staples etc. In the present embodiment, stitches 150 may be used to attach the fabric to the mattress facing surface of the cover. However, other means of attaching fasteners to a fabric are within the scope and spirit of the present invention.

The removable cover comprises material that can be easily washed with a cleaning agent. Additionally, the outward facing surface of the cover is made from material that is configured to the comfortable to the touch and enjoyable for the pets to lie and sleep on. The cover may comprise material such as cotton, wall, polyester other fabrics that can be easily washed.

As mentioned above, the inflatable mattress also includes a plurality of second parts 145 of a fastener that are positioned and configured to align with and mate with first parts 140 of the fastener, which such first parts of the fastener are located along the mattress facing surface of the movable cover. In the present embodiment, the second parts of the fasteners are positioned along the sides of the inflatable mattress and the first parts of the fasteners are positioned along the mattress facing surface of the cover such that when the mattress is inflated, first parts of the fasteners 140 align with the second parts 145 of the fastener. The system may include at least two fasteners on each side of the mattress and at least two fasteners on each side of the removable cover. In one embodiment, the first part of the fastener may be a male portion of a snap and the second part of the fastener may be a female portion of a snap. In other embodiments, other two-part fasteners may be used, such as a hook and loop fastener, button and hole, hooks, pins, press studs, magnets, buckles, tie-straps, etc. or any combination thereof. In the present embodiments, the first and second parts of the fasteners are configured such that the first and second parts of the fasteners can be decoupled when a certain amount of force causes act on the first and second parts of the fastener.

The mattress may also include at least one loop or looped material 155 along at least one side of the mattress. In the present embodiment, the loop material may comprise a first end 166 opposing a second end 157. Each of the ends of the loop 155 are attached or fixed to a side 115 of the mattress. The looped material allows the mattress to the hung up on a protruding element of a wall or external surface. For example, the looped material used to hang the mattress on a hook within a closet or other area such that the mattress can be hung when the mattress is not in use. The attached loop 155 also allows a user to hang the mattress such that it can be cleaned efficiently and out of the area where the domesticated animal resides or sleeps.

The system may also include suction cups 210 affixed to the bottom of the mattress. A suction cup, also sometimes known as a sucker, is an object that uses negative fluid pressure of air or water to adhere to nonporous surfaces and in the process creates a partial vacuum. Suction cups are made of highly flexible synthetic materials such as PVC plastic or neoprene. When the center of the suction cup is pressed against a flat, non-porous surface, the volume of the space between the suction cup and the flat surface is reduced, which causes the air between the cup and the surface or ground 215 to be expelled past the rim of the circular cup. When the user ceases to apply physical pressure to the center of the outside of the cup, the elastic substance of which the cup is made tends to resume its original, curved shape. Because most of the fluid has already been forced out of the inside of the cup, the cavity which tends to develop between the cup and the flat surface has little to no air or water in it, and therefore lacks pressure. The pressure difference between the atmosphere on the outside of the cup, and the low-pressure cavity on the inside of the cup, is what keeps the cup adhered to the surface. The suction cups 210 are configured for preventing movement of the mattress when the suction cups engaged the ground or external surface 215. In the present embodiments multiple suction cups are affixed to the bottom 205 of the inflatable mattress. In the present embodiment, four suction cups are affixed to the bottom of the mattress, one suction cup proximate to each corner. However, in other embodiments, additional or less suction cups may also be used. For example, one large suction cup configured to adequately maintain the mattress in a single location when the forces created by a domesticated animal jumping or fidgeting on top of the mattress may be used.

Referring to FIGS. 5A-5E, in one embodiment, the inflatable mattress may be deflated, by opening the valve and allowing the air within the mattress to exit, thereby reducing the dimensions of the mattress and allowing the mattress to the folded. FIG. 5D illustrates one embodiment of the mattress in a deflated state and folded into a smaller dimension than when in the inflated state. The cover may also be removed and rolled up or folded into a smaller state 540 as illustrated in FIG. 5E. The system may also include a tote bag 510 (illustrated in FIG. 5A). The tote bag is configured such that it can receive the mattress in a deflated and folded states as well as the cover in its smaller state. The system may also include cleaning agent for cleaning the outward facing surface of the inflatable mattress 105 and may be used for washing and cleaning the removable cover. In the present embodiments, the cleaning agent is in the form of a solution 530 and inserted into a capped bottle 525. The cleaning agent may also be configured for cleaning or washing the removable cover after the cover has been removed from the mattress. The cleaning agent may be substances, such as liquids, powders, sprays, or granules, that are used to remove dirt, including dust, stains, bad smells, and clutter on surfaces. Purposes of cleaning agents include health, beauty, absence of offensive odor, and avoiding the spreading of dirt and contaminants to oneself and others. Some cleaning agents can kill bacteria and clean at the same time.

The cleaning agents may include the greasers, sodium hydroxide, potassium hydroxide, alkaline washing agents, bleach, water, chromic acid, cyanuric acid, vinegar, detergents, antibacterial agents, trisodium phosphate, sodium percarbonate, sodium perborate, acetic acid, borax or any combination thereof. Other cleaning agents are also within the scope and spirit of the invention. The cleaning agent may be a solution form, gel form or solid form.

The system may also include a hand pump 520 as illustrated in FIG. 5B. The hand pumps may be a manually operated pumps that use human power and mechanical advantage to air from the outside environment into the inflatable mattress. In other embodiments, the pump may be a mechanical or electrical pump powered by an external power source. Such pumps are well known to those skilled in the arts and other pumps are within the spirit and scope of the invention.

The system may be included as a part of a kit used for increasing the cleanliness of a sleeping area of a domesticated animal. The kit may include a tote bag 510 having an opening that can be closed using a fastener, such as a zipper 515. The tote bag may be configured to include the hand pump 520, container with cleaning agent, inflatable mattress in a deflated state and folded 535 and the removable cover detached and folded or rolled up in a smaller state 540.

In operation, the kit for increasing cleanliness of a sleeping area of a domesticated animal can be opened. If the kit comprises a tote bag, the bag can be opened so that the contents of the bag may be removed. Next, the folded mattress in the deflated state 525 may be unfolded. If suction cups 210 are included with the kit, then the cups may be affixed to the bottom 205 of the mattress. The suction cups may be affixed using a fastener, or glue. In other embodiments the cups may be integral with or may be permanently affixed to the bottom of the mattress. Next, the inflatable mattress can be inflated to the inflated state (as illustrated in FIGS. 1, 2 and 4) using the valve 120. As mentioned above, a pump, such as a hand pump 520 can be used to inflate the mattress. Additionally, electric pumps, gas pumps, hair dryers may also be used to inflate the mattress to an inflated state. After inserting the mattress into the inflated state, the valve can be closed or capped such that the air within the mattress held by the reservoir remains within the mattress. Next, the removable cover 125 can positioned such that the top of the mattress is covered and the first part of the fasteners 140 align with the second part of the fasteners 145 (as illustrated in FIG. 2) along the sides of the mattress. Additionally, an additional second part of a fastener on the top of the mattress and an additional first part of a fastener on the removable cover that aligns with the top of the mattress may also be used such as to further facilitate coupling the removable cover to the mattress. Next, forces are applied to the first and second part of the fasteners such that the first and second part of the fasteners mate and couple to each other. As a result, the removable cover is coupled to the mattress. Next, a user may apply force such as to engage the suction cups with the ground 215 (as illustrated in FIGS. 2 and 4) so that the mattress remains in one location even when forces from a domesticated animal on top of the mattress act on the mattress.

Next, if the inflatable mattress, cover, or area surrounding the mattress and cover becomes dirty or contaminated with dirt or other contaminants, then the system can be disassembled in order to clean the area and system. To disassemble, first, force is applied on the first 140 and second parts 145 of the fasteners such that the fasteners de-couple allowing the removable cover to be removed from the mattress. Next, cleaning agents, such as those illustrated in the cleaning solution 530 can be used to wash the washable fabric of the cover. Next, force is applied to the suction cups 210 such that the suction is disengaged from the surface or ground 215 so that the mattress can be removed. Next, a user can hang the mattress using the looped material 155 on a wall or any closet in order to clean the mattress. In other embodiments, the mattress can be cleaned without having to hang the mattress. Next, the cleaning agent or solution can be used to disinfect the area of the domesticated animal's sleeping area.

After cleaning the domesticated animal's living area, the mattress can be re-inflated, the cover reattached, and positioned to the desired position as described above.

In other embodiments, the kit may also be used for traveling with a pet. The kit is configured for easy transporting. Additionally, as mentioned above, the looped material can be used to hang or store the mattress whether in an inflated or deflated state when not in use.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A system for increasing cleanliness of a sleeping area of a domesticated animal comprising:
    an inflatable mattress having a top opposing a bottom and a plurality of sides;
    a removable cover for covering the top and at least a portion of each side of the inflatable mattress; and,
    a plurality of fasteners for removably attaching a mattress facing surface of the cover to the sides of the inflatable mattress; and,
    a tote bag configured to enclose the mattress when the mattress is in the deflated state, the removable cover, and cleaning agent contained within a bottle configured to clean the mattress and the cover.

2. A kit for increasing cleanliness of a sleeping area of a domesticated animal comprising:
    an inflatable mattress having a top opposing a bottom and four sides, wherein at least a portion of the top and sides of the mattress comprises PVC configured for easy removal of dirt and other contaminants, and wherein the mattress comprises at least one inflatable member having a valve for allowing a flow of air into and out of a reservoir inside the mattress to adjust the mattress between an inflated state and deflated state;
        wherein a second part of at least two fasteners are affixed to each side of the mattress, wherein each second part of each fastener is configured to mate with a first part of the fastener;
    a removable cover comprising material that is washable for covering the top and at least a portion of each side of the inflatable mattress;
        wherein a mattress facing surface of the cover includes a plurality of the first parts of fasteners affixed to the mattress facing surface of the cover, wherein each of the first parts of the fasteners are configured to mate with the each of the second parts of the fasteners;
        wherein when the first and second parts of the fasteners mate the cover is removably coupled to the inflatable mattress;
    a plurality of downward facing suctions cups affixed to the bottom of the inflatable mattress, wherein the suctions cups are configured for preventing movement of the mattress when the suction cups engage an external surface;
    a bottle containing cleaning agent for cleaning the inflatable mattress and removable cover; and
    a tote bag configured to enclose the mattress when in a deflated state, the removable cover and the bottle containing cleaning agent.

3. The kit from claim 2, wherein the kit further comprising a pump for inflating the mattress.

4. The kit from claim 2, wherein in the inflated state the mattress can support weight from at least one domesticated animal.

\* \* \* \* \*